(12) United States Patent
Fischer et al.

(10) Patent No.: US 10,710,314 B2
(45) Date of Patent: Jul. 14, 2020

(54) DEVICE AND METHOD FOR SETTING A PRESS-IN ELEMENT

(71) Applicant: Bayerische Motoren Werke Aktiengesellschaft, Munich (DE)

(72) Inventors: Fabian Fischer, Grafrath (DE); Oguzhan Eroglu, Biberach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 567 days.

(21) Appl. No.: 14/930,825

(22) Filed: Nov. 3, 2015

(65) Prior Publication Data

US 2016/0052198 A1    Feb. 25, 2016

Related U.S. Application Data

(63) Continuation of application No. PCT/EP2014/063274, filed on Jun. 24, 2014.

(30) Foreign Application Priority Data

Jul. 5, 2013   (DE) .................. 10 2013 213 196

(51) Int. Cl.
*B29C 65/00*   (2006.01)
*F16B 4/00*   (2006.01)
(Continued)

(52) U.S. Cl.
CPC ........ *B29C 65/565* (2013.01); *B29C 65/7802* (2013.01); *B29C 65/7841* (2013.01);
(Continued)

(58) Field of Classification Search
None
See application file for complete search history.

(56) References Cited

U.S. PATENT DOCUMENTS 677,711 A * 7/1901 Stapf .................. B42B 4/02
5,213,647 A   5/1993 Chapron et al.
(Continued)

FOREIGN PATENT DOCUMENTS

DE        101 03 388 A1    8/2002
DE   10 2004 038 084 A1    3/2006
DE   10 2012 007 357 A1   10/2013

OTHER PUBLICATIONS

Chinese Office Action issued in counterpart Chinese Application No. 201480030947.5 dated Jul. 25, 2016 with English-language translation (twenty-three (23) pages).
(Continued)

*Primary Examiner* — Linda L Gray
(74) *Attorney, Agent, or Firm* — Crowell & Moring LLP

(57) ABSTRACT

A device and a method are provided for setting a press-in element into a workpiece at a predetermined location. The device includes main body; a fixing unit, which is attached to the main body and which is designed to fix the workpiece; and a processing unit, which is attached to the main body and includes: a boring unit, which is designed to create a bore in the workpiece fixed by the fixing unit; and a pressing unit, which is designed to press a press-in element into the bore. The method fixes the workpiece; creates a bore in the workpiece; positions a press-in element over the bore; and presses the press-in element into the bore, wherein a single device is used to carry out the method.

2 Claims, 3 Drawing Sheets

(51) Int. Cl.
| | |
|---|---|
| *F16B 37/00* | (2006.01) |
| *B29C 65/56* | (2006.01) |
| *F16B 37/04* | (2006.01) |
| *B29C 65/78* | (2006.01) |
| *B29L 31/30* | (2006.01) |
| *B29C 65/64* | (2006.01) |
| *B29L 1/00* | (2006.01) |
| *B29L 31/00* | (2006.01) |

(52) U.S. Cl.
CPC .... *B29C 65/7876* (2013.01); *B29C 66/02242* (2013.01); *B29C 66/474* (2013.01); *B29C 66/7212* (2013.01); *B29C 66/8322* (2013.01); *B29C 66/93451* (2013.01); *F16B 4/004* (2013.01); *F16B 37/048* (2013.01); *B29C 65/64* (2013.01); *B29C 65/7844* (2013.01); *B29C 66/1122* (2013.01); *B29C 66/72141* (2013.01); *B29C 66/7392* (2013.01); *B29C 66/7394* (2013.01); *B29C 66/742* (2013.01); *B29C 66/7461* (2013.01); *B29C 66/7487* (2013.01); *B29C 2793/0045* (2013.01); *B29C 2793/0081* (2013.01); *B29L 2001/002* (2013.01); *B29L 2001/005* (2013.01); *B29L 2031/3002* (2013.01); *B29L 2031/3055* (2013.01); *B29L 2031/3067* (2013.01); *B29L 2031/3076* (2013.01); *B29L 2031/737* (2013.01)

(56) References Cited

U.S. PATENT DOCUMENTS

| | | | |
|---|---|---|---|
| 5,231,747 A | 8/1993 | Clark et al. | |
| 5,536,344 A | 7/1996 | Van Druemel | |
| 6,306,239 B1 * | 10/2001 | Breuer | B29C 70/30 156/245 |
| 6,415,170 B1 * | 7/2002 | Loutis | A61B 5/04087 600/391 |
| 6,702,660 B2 * | 3/2004 | Gundy | B23B 51/00 451/541 |
| 2013/0051909 A1 | 2/2013 | Takahashi | |

OTHER PUBLICATIONS

International Search Report (PCT/ISA/210) issued in PCT Application No. PCT/EP2014/063274 dated Sep. 17, 2014, with English translation (six (6) pages).

German Search Report issued in counterpart German Application No. 10 2013 213 196.8 dated Mar. 25, 2014, with partial English translation (ten (10) pages).

* cited by examiner

DEVICE AND METHOD FOR SETTING A PRESS-IN ELEMENT

CROSS REFERENCE TO RELATED APPLICATIONS

This application is a continuation of PCT International Application No. PCT/EP2014/063274, filed Jun. 24, 2014, which claims priority under 35 U.S.C. § 119 from German Patent Application No. 10 2013 213 196.8, filed Jul. 5, 2013, the entire disclosures of which are herein expressly incorporated by reference.

BACKGROUND AND SUMMARY OF THE INVENTION

The present invention relates to a device and a method for setting a press-in element. The present invention especially relates to a device and a method for setting a press-in element into a workpiece consisting of plastic or fiber composite material, such as CFK, especially in vehicle construction, at a predetermined point.

In many applications, the use of plastics, especially fiber-reinforced plastics, is increasingly common. This is especially the case in vehicle construction, including automobile construction, aircraft construction, ship building and other vehicle applications, as well as also in the production of everyday objects. The production of connections to other workpieces in the case of molded parts consisting of plastic is often difficult, however. In automobile construction, it is known, for example, to realize load application points on fiber composite workpieces via bonded studs or the like. The problems in this case are the exact positioning, the surface requirement for the bonded connection, and the durability of the bond under specific environmental conditions (e.g. temperature, moisture, exposure to light, alternating stress, etc.). From boat building it is also known, for example, to realize a load application point on a fiber composite workpiece by a threaded fastening using a back-fitting metal plate which carries a connecting element. Here also, a corresponding surface requirement is to be taken into consideration, and in addition material pairing problems, such as corrosion on connecting surfaces of metals to workpieces consisting of carbon fiber-reinforced material and the like, are possible. From prosthetics, a direct screwing in of threaded bolts consisting of a fiber composite material in bone tissue (which can be understood as a natural fiber composite material) is known. In technical fields of application of fiber composite materials this is usually not possible since there can be a significant risk of damage and/or failure, depending on the load case. In general, it is also known from fiber composite technology to integrate, such as to cast, to embed or the like, connecting elements directly into a laminate workpiece or a plastic workpiece. Such fastening elements are then to be positioned already in the wet phase of the production of the workpiece and are subsequently not variable.

It is also known from metal constructions to use press-in elements such as press-in nuts, press-in threaded bolts, press-in eyelets or the like, especially in shell-like or plate-like workpieces for the realization of load application points. In this case, holes are introduced into the workpiece such as by drilling or stamping, and then the press-in element is pressed into the hole by machine or manually using a setting tool. A plastic material deformation on the workpiece and/or on the press-in element, which consequently incurs an inseparable connection at least in the region of a design load, typically takes place in this case. Such solutions are known, for example, as set rivets, rivet nuts, press-in nuts or the like. In fiber composite materials, this procedure is poor in its application since deformations of the material can lead to irreversible material damage.

The present invention starts from the consideration of setting a press-in element in a workpiece, especially consisting of plastic or fiber composite material, such as CFK (with carbon fiber-reinforced plastic) or the like, in a way that a cylindrical section of a press-in element is to be pressed into a hole of a workpiece (possibly having, though not always necessarily, an increased material thickness at the point in question), wherein the cylindrical section of the press-in element has a suitable oversize compared with the hole so that a retention force or extraction force is created essentially via the face pressure between the hole and the cylindrical section of the press-in element. A variable pressing by means of additional form fitting via, for example, locking hooks, is similarly contemplated. A challenge in this case is that the pressing-in has to take place with high positional accuracy since an already slight lateral misalignment in the order of magnitude of, for example, $1/100$ mm or an angular inaccuracy in a corresponding magnitude could partially lead to the plastic or composite material at one point experiencing an excessively high face pressure. This can lead to damage so that overall a reduced pressing force, possibly even a clearance, which can significantly reduce the extraction force of the press-in element from the workpiece, is created. Up to now, no method and no mechanical realization has been known by which such a pressed connection can be produced with sufficient process reliability in order to reliably ensure the necessary positional and angular accuracies during the pressing-in.

In more general terms, no (material-perfect) fiber composite—suitable solution for implementation of a threaded connection and/or fastening of further workpieces to endless fiber-reinforced plastic workpieces has been available since the implementation of a threaded connection is often accompanied by damage to the fiber composite.

It is therefore an object of the present invention to provide a device and a method which at least partially avoids the disadvantages of the prior art, as previously described. In particular, an object of the present invention entails providing a device and a method which enable a process-reliable introduction of connecting points on fiber-reinforced workpieces or on other plastic workpieces.

The aforesaid object is achieved at least in partial aspects by way of a device according to embodiments of the invention and a method according to embodiments of the invention. In this case, features and details, which are described in conjunction with the device according to the invention, also apply in conjunction with the method according to the invention and reciprocally and interchangeably in each case so that reference is always made, or can be made, reciprocally with regard to the disclosure of the individual aspects of the invention.

Proposed according to one aspect of the present invention is a device for setting a press-in element into a workpiece, especially consisting of plastic or fiber-reinforced material such as CFK, especially in vehicle construction, at a predetermined point, wherein the device includes:
  a basic body;
  a fixing unit, attached to the basic body, which is designed for the fixing of the basic body;
  and a processing unit, which is attached on the basic body and includes:

a drilling unit, which is designed for introducing a hole in the workpiece which is fixed by use of the fixing unit; and a pressing-in unit, which is designed for pressing a press-in element into the hole.

Within the meaning of the invention, a structural unit which forms a spatial reference and a constructional add-on structure for further units of the device is to be understood by a basic body. The basic body can be handled separately or can be part of a larger system. Meant by a fixing within the meaning of the invention is a fastening of the workpiece in such a way that the workpiece is immovable, at least during the processing by the device, in relation to the fixing unit—and therefore in relation to the device itself. The fixing especially comprises a detachable fastening, for example, but not exclusively, by clamping, gripping, suction, etc. The term attaching within the meaning of this aspect of the invention can be a joining, for example, but not exclusively, by screwing, welding or the like. In a broader sense, attaching can also be a fixed supporting or, providing the previously explained effects of the invention are not impaired thereby, can comprise a movable supporting or guiding. For example, the attaching of the processing unit on the basic body comprises a joining of fixed supporting of the processing unit on the basic body, especially if the fixing of the workpiece is carried out separately for each setting process. In one modification, the attaching of the processing unit can comprise a supporting on the basic body in such a way that the processing unit is movable to a certain extent with regard to the workpiece in order to be able to carry out processing procedures at a plurality of predetermined points without releasing the fixing of the workpiece. In this case, the predetermined points can be approached by moving the processing unit, wherein the movability of the processing unit at the predetermined points can be fixed by locking, braking means or fixing bodies, by a toothed wheel engagement, or by other measures.

The proposed device of this aspect of the present invention enables a substantial simplification of the setting process since drilling and pressing in are possible by use of one and the same device. Furthermore, an accurate positioning and pressing in at the predetermined point can be ensured since the workpiece is fixed on the basic body. By integrating the drilling unit and the press-in unit on a processing unit, a deviation when pressing the press-in element into the hole can be minimized and the required pressing in quality can be achieved. The processing unit, in other words, forms a mounting or guide for the drilling and press-in unit (which can also be referred to as the tools of the device) so that positional relationships of the workpiece, of the basic body and of the tools, apart from manufacturing tolerances, bearing clearances and elasticities, are determined.

In one development of the present invention of this aspect, the processing unit is designed in order to selectively bring the drilling unit or the press-in unit into a predetermined working position corresponding to the predetermined point, wherein a working axis of the drilling unit, when the drilling unit is located in the working position, and a working axis of the press-in unit, when the press-in unit is located in the working position, coincide at least for the most part. In this case, the working axis of the drilling unit can also be referred to as the drilling axis and the working axis of the press-in unit can also be referred to as the pressing axis. The working axis can also generally be referred to as the advancing axis or feed axis of the respective tool. It is preferred at the present time that when using the device the fixed workpiece is deemed to be stationary, whereas the drilling unit or the press-in unit moves spatially in relation to the basic body and therefore in relation to the workpiece which is fixed thereupon. The disclosure, however, also embraces the kinematically reverse case that the processing unit together with the drilling unit and the press-in unit are stationary, whereas the workpiece is spatially movable. Since the working axes of the drilling unit or the press-in unit, if they are located in the working position in each case, at least in the main coincide, it can be ensured with higher precision that the press-in element is pressed into the hole with axial alignment. Lateral misalignment or angling is therefore excluded for the most part according to definition so that an eccentric or askew insertion or pressing of the press-in element into the hole is mainly avoided so that one-sided or spot damages to the material associated therewith and loosening of the press-in element associated therewith and finally a reduction of the extraction force can at least mainly also be avoided. The process reliability of introducing the press-in element into the workpiece can be further improved as a result. The terms mainly or at least in the main coinciding admittedly includes design-related and manufacturing-related tolerances, bearing clearances, etc., which can never be completely excluded. The working position can, but not necessarily, be lockable by latches, stops, or the like.

A particularly accurate positioning can be achieved when the processing unit is designed in order to guide the drilling unit and the press-unit in a combined movement. Meant by a combined movement within the meaning of the invention is that the drilling unit and the press-in unit move together, or are guided together, at least with regard to a spatial direction or rotational direction. Meant by a non-combined movement, in contrast to this, is that the drilling unit and the press-in unit can be moved, or can move, totally independently of each other. An example of a non-combined movement of movability would be an attachment on robot arms which can move independently of each other. In the case of a combined movement, tolerances can be added to a lesser extent than in the case of freer or independent movements of the drilling unit and of the press-in unit. Therefore, the accuracy of positioning of the drilling unit and of the press-unit can be improved as a result of a combined movement. The less the degrees of movement of the drilling unit and of the press-in unit are permitted, and the more the permitted degrees of movement of the drilling unit and of the press-in unit are intercoupled or fixed in relation to each other, the more this applies. The accuracy can in this sense mostly be improved when the drilling unit and the press-in unit are movable in relation to the fixed workpiece in only a single degree of freedom and they can only move together in this degree of freedom.

The device is advantageously designed so that the processing unit has a tool holder for accommodating the drilling unit and the press-in unit, wherein the tool holder is movably mounted in relation to the basic body and able to be driven, wherein the drilling unit and the press-in unit are fastened on the tool holder, and wherein the working position corresponds to a predetermined, preferably fixable, locked position or end position of the tool holder. In other words, in this embodiment the tools (the drilling unit and the press-in unit) move together with the tool holder which is mounted on the basic body. In this way, a combined movement of the drilling unit and of the press-in unit can be realized. The locked position or end position of the tool holder can be realized for example, but not exclusively, by stops or locking bolts or a toothed wheel engagement or the like. In an alternative embodiment, the tools can be movably guided or mounted individually on the processing unit. This can be effected and implemented via a displacement mimic, for example, which establishes at least one translational degree of freedom.

In a particular embodiment, the device is designed in such a way that the tool holder is mounted in a movable and drivable manner in relation to the basic body around a rotational axis. Rotational movements can be technologically easily controlled or implemented and have good kinematics. By means of the rotational movement of the tool holder, the drilling unit and the press-in unit can be swung into the working position and swung out of this in a simple manner. If the drilling unit and the press-in unit are fastened in a stationary manner on the tool holder (as seen relative to the tool holder), a combined movement of the drilling unit and of the press-in unit can therefore be realized in a particularly simple manner. In an alternative embodiment, the tool holder is mounted on the basic body in a linearly displaceable and drivable manner.

The rotational axis of the tool holder can, for example, be parallel to a processing surface of the workpiece. In this case, the drilling unit and the press-in unit are advantageously arranged so that the working axes are radial to the rotational axis of the tool holder (star-shaped arrangement). With this, at least one tool, i.e. either the drilling unit or the press-in unit, can be swung towards the workpiece so that the working axis is perpendicular to the processing surface. If the tool holder is rotated around the rotational axis, the one tool is swung away from the workpiece and another tool is swung towards the workpiece. As a result of this, for example when the drilling unit is swung towards the workpiece, which at the same time means that the press-in unit is swung away from the workpiece, the press-in unit can be easily accessible, as a result of which it can be easily equipped with a (following) press-in element.

In an embodiment alternative, the rotational axis can also be perpendicular to the processing surface, wherein the working axes are advantageously arranged parallel to the rotational axis (vertical turret principle). In contrast to the radial (star-shaped) arrangement of the working axes, the tools (drilling unit, press-in unit), in the case of a vertical turret-like arrangement, can be arranged altogether closer to the rotational axis and as a result of this the inertia moment of the processing unit together with the drilling unit and the press-in unit can be altogether lower. This can improve precision, setting speed and fatigue behavior of the device. As a further modification, an inclined arrangement of the rotational axis can be provided, wherein the rotational axes have an angle in relation to the rotational axis which corresponds to the inclined position angle of the rotational axis (conical turret arrangement).

In a preferred embodiment of the present invention according to this aspect, the drilling unit and the press-in unit, at least in part, are movable and drivable in the direction of their respective working axes in relation to the processing unit. For example, the press-in unit has a guide part and a press-in part, wherein the press-in part is mounted in the guide part in a linearly displaceable and drivable manner in the direction of the pressing axis (working axis) of the press-in unit. Equally, the drilling part can have a guide part and a drilling part, wherein the drilling part is mounted in a linearly displaceable and drivable manner and also rotatable and drivable manner in the rotational direction in the direction of the drilling axis (working axis) of the drilling unit. In other words, the advancing or feed movement for the drilling or pressing in is at least partially implemented by the drilling unit or press-in unit itself. In this case, lower masses are to be moved than when the entire tool holder is movable and drivable in the feed direction, which is possible, however. A movement or movability capability of the tool holder as a whole in relation to the workpiece, at least over a partial stretch of the feed path, can, however, be advantageous for a workpiece change, for example. If necessary, a feed movement or advancing movement towards the tool holder to or from the workpiece together with a fixing of the workpiece by way of the fixing unit can be carried out or coupled therewith.

In a preferred embodiment of the present invention according to this aspect, provision is made for a feed unit which is designed for the automatic feeding of press-in elements. This facilitates handling of the device since a manual equipping or collecting of the press-in elements from a support unit is not necessary. If, in addition, the feed unit is attached on the basic body, the feeding of the press-in elements, and possibly taking over by the press-in unit, can be enabled in a precise manner.

In a further preferred embodiment of the present invention according to this aspect, a plurality of press-in units for different types of press-in elements are provided on the processing unit. This facilitates the use of different press-in element. In this case, a separate feed unit can preferably be provided for each type of press-in elements. As a further option, a plurality of drilling units for different hole diameters can also be provided if the different types of press-in elements have press-in sections of different diameter.

In a development of the present invention according to this aspect, provision is made for a suction device which is designed for sucking up drilling residue. Dust, swarf, pieces, fiber portions, etc., for example, but not exclusively, can be understood by the term drilling residue. Particularly in the case of plastic or fiber composite materials, depending on the material used, or material of the matrix and/or fibers or material of a solid body, a possible static charge can make cleaning up of the drilling residues difficult. The suction device can preferably be fastened on the basic body and/or on the fixing unit or can be integrated altogether into the device. Alternatively, an external suction device can also be used.

In a development of the present invention according to this aspect, the fixing unit has a support element, which supports the workpiece from a rear side, and a clamping element, which clamps the workpiece from a processing side to the support element. By way of the support element and the clamping element, fixing of the workpiece can be implemented in an effective manner, wherein the support element additionally forms a counter support against a drilling or press-in force. The disclosure of this invention is, however, not limited to clamping in the previously described manner, rather a fixing of the workpiece can be implemented in a variety of ways. For example, provision can be made for grippers, which grip the workpiece from the side or in an opening (a penetration) of the workpiece, or a fixing of the workpiece can be effected by use of a negative pressure force, which, for example, is by suction cups or the like which are seated on the workpiece surface and subjected to a negative pressure.

In a development of the present invention according to this aspect, the press-in unit is designed in order to accommodate the press-in element with a clearance. By accommodating the press-in element with a clearance, the press-in element can additionally be aligned with the hole, wherein a bevel (chamfer), which is preferably provided on the press-in element, can be utilized.

In another or additional development of the present invention according to this aspect, the press-in unit is designed in order to elastically accommodate the press-in element such that the press-in element is retained on the press-in unit against external force action. As external forces, for example inertia forces, which are effective during movement of the press-in unit and shear force which is effective during normal operation, can be considered. In other words, holding by use of an elastic element, which holds the press-in element on or in the press-unit until the press-in element is pressed into the workpiece, is carried out. The elastic element can be an O-ring, for example. The retention force of the elastic element is in this case preferably designed so that the press-in element itself can be aligned with the edge of the hole when it is fed by the press-in unit in the direction of the workpiece. As a result, a misalignment in relation to the hole axis can largely be avoided. In order to avoid an angular misalignment, it can be provided that the press-in element is supported in a fixed manner (that is to say non-elastically, at least in the main) by the press-in unit in the feed direction.

In a further or additional development of the present invention according to this aspect, the press-in unit has a formed part, which is adapted to a formed section of the press-in unit, in order to accommodate the press-in element. As a result, formed features of the press-in element can be effectively utilized in order to accommodate it by the press-in unit.

In a preferred embodiment of the present invention, the press-in unit is designed in order to receive the press-in element from the feed unit while the drilling unit is in its working position. This can accelerate the processing cycle and is to be put into effect in a particularly simple manner in an embodiment of the device in which the press-in unit swings away from the processing point. Alternatively, feeding of the press-in elements can also be carried out directly at the processing point.

In a development of the present invention according to this aspect, the basic body is designed for the fastening of a processing machine or for manual handling. A processing machine can have, for example, but not exclusively, a robot arm or a portal guide or the like. If the basic body is designed for fastening on such an element of the processing machine, the device can be moved automatically by the processing machine and the processing operations can be automated in a particularly easy manner. Also, the processing point can be approached in a particularly accurate manner. The design for manual handling can, for example, but not exclusively, be implemented by hand grips, possibly supported by a bearing arrangement on a weight-balancing pivot arm, wherein release elements can be provided on the hand grips for the functional component parts of the device. In the case of manual handling, a variable application of the device in workshop or laboratory operation is also particularly simple.

In a preferred development of the present invention according to this aspect, provision is made for a computing unit. The computing unit is connected to the device or integrated into this and is constructed and designed to control the drilling unit so that when the hole is being introduced into the workpiece at least one parameter from the group which includes a feed speed, a rotational speed and an advancing force of the drilling unit is adapted to a predetermined drilling scheme. In other words, an open loop or closed control of speed, rotational speed or force can be carried out. The drilling scheme can especially preferably provide that a feed speed and/or an advancing speed is reduced at the commencement of the drilling and also shortly before penetration of a workpiece surface on the rear side. This can reduce a breaking away or delamination of the last laminate layers (especially in the case of workpieces consisting of carbon fiber-reinforced materials), which can occur in the case of excessively rapid drilling through. Optionally, the pressing-in process by use of the press-in unit can also be controlled by the computing unit with regard to advancing, press-in movement sequence (possibly also rotationally assisted) and/or pressing force. For feedback of the parameters, provision could be made for one or more suitable transducers which transmit(s) to the computing unit signals which represent forces, distances, moments or rotational speeds.

According to a further aspect of the present invention, a method is proposed for setting press-in elements into a workpiece, especially consisting of plastic or fiber composite material, such as CFK, wherein the method features the following method steps:

a) fixing the workpiece,
b) introducing a hole into the workpiece,
c) positioning a press-in element over the hole, and
d) pressing the press-in element into the hole, wherein for carrying out the method use is made of a single device which intrinsically combines the functions which are required for realizing the method steps a) to d). The device can especially be the previously described device. The introducing of the hole into the workpiece can preferably be carried out while sucking up drilling residues in the region of the hole, and the positioning of the press-in elements over the hole can preferably be carried out with automatic feed of the press-in element. Finally, a step for quality assurance of the pressing-in process can be provided.

In a development of the method according to the invention according to this aspect, before carrying out the method steps a) to d), a pretreatment of the processing surface is carried out at least in the region of the predetermined point. A pretreatment can include any type of pretreatment which is suitable for optimization of the method. For example, roughing of the processing surface can especially improve the "cut" of a drill which is used when carrying out the method. Such roughing can, for example, but not exclusively, be carried out by sand blasting methods or blasting with another blasting material such as corundum. A further pretreatment possibility is the application of additional layers (films, lacquer, etc.) to the surface.

The method and the device according to the present invention can especially be adapted for the use of a press-in element consisting of metal, plastic, ceramic or fiber composite material particularly with carbon continuous fiber-reinforced composite material, for producing a load application point into a workpiece. The workpiece can preferably be a plastic workpiece or a fiber-reinforced, especially a long fiber-reinforced composite workpiece. A workpiece consisting of CFK can especially preferably accentuate the advantages of the present invention. The press-in element can preferably have a cylindrical section for pressing into the previously described hole. The cylindrical section can have a profile which is designed in order to increase the extraction load of the press-in element from the workpiece in relation to a smooth external contour. The press-in element can have a hole or an axially projecting bolt. The hole is preferably provided with a female thread or the bolt is provided with a male thread. As a result of this design of the press-in element, load application points or fastening points can be especially advantageously realized on the workpiece. Alternatively, the press-in element can also have a smooth surface which, for example, can be used as surfaces for the positioning of a weld point.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the invention are described below with reference to the attached drawings. In this case, the same constructional elements in the various figures are provided with the same designations in each case. Constructional elements and features, purposes and effects, which are described with reference to an exemplary embodiment, provided they are not expressly or obviously excluded, are to be assumed to be applicable in every other exemplary embodiment and are also deemed to be disclosed in relation to the respectively other exemplary embodiment, even if they are not expressly shown and/or described there. It is furthermore understood that the drawings are to be understood as being schematic and no limitations are to be gathered from them with regard to concrete dimensions or size ratios, unless these were to be expressly described as such.

Figure 1A:
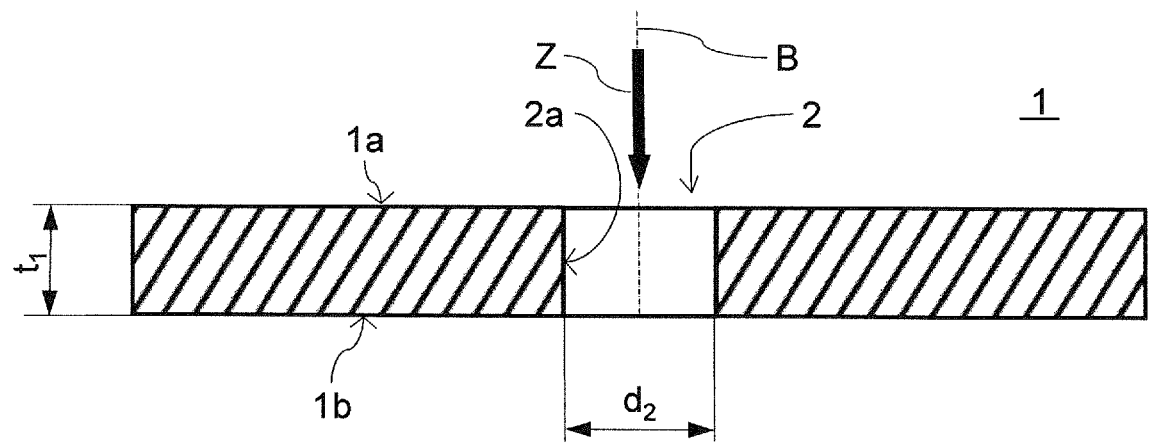
FIG. 1A is a schematic representation of a workpiece with a hole for illustrating a step in a method as an exemplary embodiment of the present invention.

First, a method for setting a press-in element into a workpiece is described below, with reference to FIGS. 1A and 1B, as an exemplary embodiment of the present invention. FIG. 1A shows a workpiece 1 in which a hole 2 has been introduced by means of a first method step. In this case, a dash-dot line "B" illustrates a drilling axis and an arrow "Z" illustrates a feed direction of a drilling tool for introducing the hole 2 into the workpiece 1. The workpiece 1, which is a planar workpiece (shell structure or plate structure) with a thickness $t_1$, is produced from a fiber composite plastic, such as CFK. It may be noted, however, that the method according to the invention is equally applicable to other plastic workpieces or fiber-reinforced workpieces, such as fiber composite materials with thermoplastic, duroplastic, reaction resin matrix or monolithic workpieces consisting of plastic, such as duroplastics, as well applicable to workpieces consisting of other materials, such as metals, wood or others.

The hole 2 is introduced by use of a suitable drill with the aid of a drilling tool from a processing surface 1a of the workpiece 1 with a hole diameter d2 so that a mainly cylindrical inner surface or inner wall 2a of the hole 2 is produced.

The drilling of plastics, especially fiber composite materials and especially such materials which have an increased brittleness, compared with drilling into metallic materials, requires the observance of particular drilling parameters and particular care when the drill penetrates the rear side of the workpiece. For example, plastics are particularly sensitive to high temperatures which can occur when drilling at high rotational speeds (more precisely, at a high circumferential speed at the outer edge or the outer surface of a drill) on account of frictional heat. Counted among the phenomena which can occur at an excessively high temperature are melting (especially in the case of thermoplastics), charring or vitrifying (especially in the case of duroplastics), as well as thermal stresses and volume changes associated therewith in the region of the inner wall 2a of the hole 2. With the occurrence of such phenomena, the observing of tolerances is made difficult, if not impossible, apart from a change of the material properties. It is therefore important to carry out the drilling process with a suitable tool and with coordination between rotational speed and feed speed in order to control the resulting frictional heat. Appertaining to the phenomena which are to be observed during the penetration of a workpiece rear side 1b are fraying, breaking away, which can reach into the surface of a workpiece side on the other side of the hole diameter (especially in the case of brittle materials such as duroplastics or epoxy resins), and also a delamination of last laminate layers (in the case of fiber composite materials). For this reason, a time-variable open-loop control of advancing force is also important for minimizing the aforesaid phenomena. In particular, a breaking away and charring of the hole edge on the workpiece rear side 1b can also be controlled by a suitable form of the drill used for introducing the hole. For example, a drill which has a centering point and a circumferential cutting edge corresponding to the hole diameter d2 can contribute to a cleaner hole edge on the workpiece rear side 1b. It can also be advantageous to reduce the feed speed (feed direction Z) upon reaching the workpiece rear side 1b in order to reduce the previously described disadvantageous phenomena. The reaching of the workpiece rear side 1b can detected by way of sensors or (in the case of manual feeding) by "finger tip feel" for example by a reduction of the advancing force at constant speed or with an increase of the feed speed with constant advancing force.

Figure 1B:
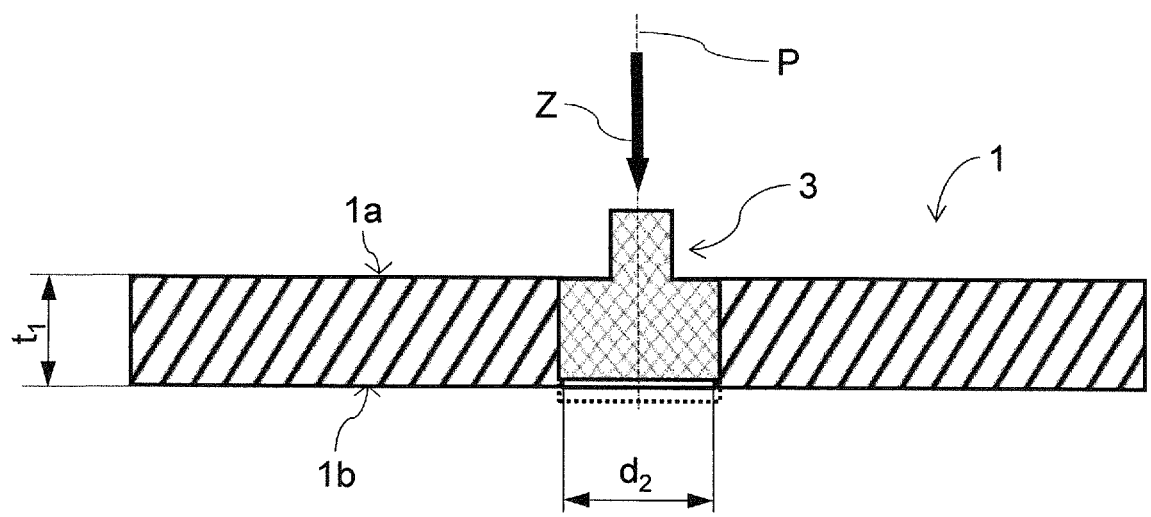
FIG. 1B is a schematic representation of a workpiece with a hole and a press-in element for illustrating a further step in the method.

In FIG. 1B, the workpiece 1 of FIG. 1A is shown with a press-in element 3 which is inserted into the hole (2 in FIG. 1A, but not specifically designated in FIG. 1B). In other words, FIG. 1B shows the workpiece 1 according to a method step of pressing the press-in element 3 into the hole. In this case, a dashed line "P" corresponds to a pressing axis or press-in axis, wherein an arrow "Z" again symbolizes the feed direction of a press-in tool which is used for pressing the press-in element 3 into the hole 2 of the workpiece 1.

Different exemplary embodiments of the press-in element 3 are now described in more detail with reference to the representations in FIGS. 2A-2E.

Figure 2A:
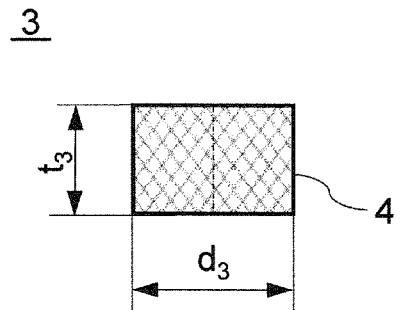
FIG. 2A is a schematic representation of a press-in element.

FIG. 2A shows a press-in element 3 with a cylindrical main body 4. To be more precise, the press-in element 3 of FIG. 2A is formed in the main by the cylindrical main body 4. The press-in element 3 has an outside diameter d3 and also a thickness (also to be referred to as height) t3. The press-in element 3 of FIG. 2A, according to the representation, has two flat end faces (not specifically designated). The flat end face of the press-in element 3 or of the cylindrical main body 4 can be inserted into the workpiece 1 (FIG. 1B) for example as a surface for the positioning of a weld point.

Figure 2B:
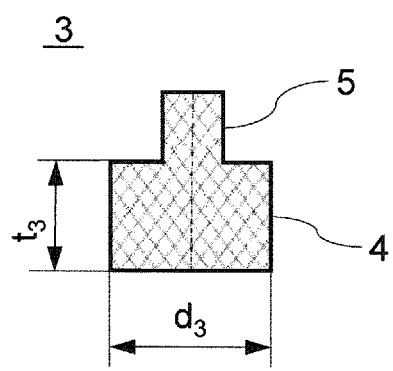
FIGS. 2B-2E are schematic representations of further, modified press-in elements.

FIG. 2B shows a press-in element 3 in a modification of the press-in element 3 of FIG. 2A. In the case of the press-in element 3 of FIG. 2B, in addition to the cylindrical main body 4, provision is made for a spigot 5 which projects coaxially from an end face of the cylindrical main body 4. The spigot 5 can have, for example, a male thread (not shown in detail) in order to form, for example, a fastening point of a plate by way of a nut when the press-in element 3 is pressed into the hole 2 of the workpiece 1.

Figure 2C:
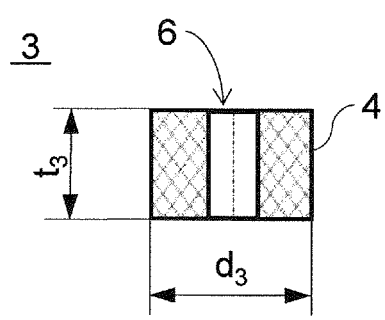

FIG. 2C shows a press-in element 3 in a further modification of the press-in element 3 of FIG. 2A. The press-in element 3 of FIG. 2C has a through-hole 6 introduced coaxially into the cylindrical main body 4. The through-hole 6 can have, for example, a female thread (not shown in detail) in order to serve as a screw-in point when the press-in element 3 of FIG. 2C is pressed into the hole 2 of the workpiece 1. In a further modification of the press-in element 3 of FIG. 2C, a blind hole is provided instead of the through-hole 6.

Figure 2D:
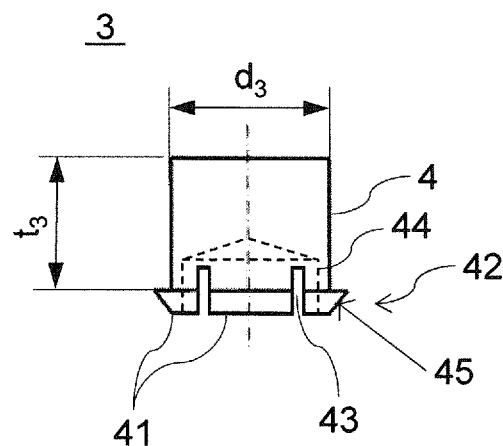

FIG. 2D shows a press-in element 3 in a modification of the press-in element 3 of FIG. 2A. The press-in element 3 of FIG. 2D has a plurality of locking hooks 41 on its main body 4. The locking hooks 41 are formed on an encompassing, chamfered ring 42 which is formed on a face end of the main body 4 and interrupted by a plurality of incisions 43. On the corresponding end, the main body 4 has a hole 44 which reaches to the depth of the incisions 43 (shown by dashed line). The locking hooks 41 therefore have a wall thickness which enables the locking hooks 41 to radially elastically recede inwards during the pressing in of the press-in element 3 and, when they leave the hole 2 on the rear side of the workpiece 1, to elastically spring back and grip behind the rear side 1b of the workpiece 1. The locking hooks 41 in this way form a further extraction protection for the press-in element. In addition, the chamfer 44 of the locking hooks 41 enables centering of the press-in element 3 on the hole 2 at the commencement of the pressing in.

Figure 2E:
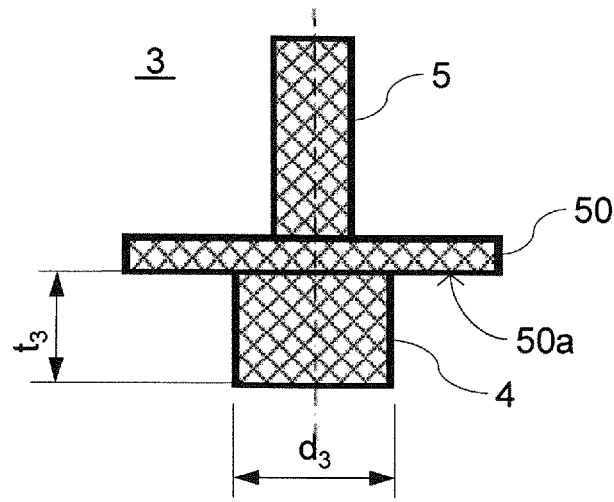

FIG. 2E shows a press-in element 3 in a modification of the press-in element 3 of FIG. 2B. The press-in element 3 of FIG. 2E, between the main body 4 and the spigot 5, has a plate 50, the outside diameter of which is larger than the outside diameter d3 of the main body 4 and larger than the diameter of the spigot 5. Therefore, the plate 50 has a stop face 50a which forms a stop with a processing surface 1a and therefore limits the press-in depth of the press-in element 3 in a well-defined manner.

Without limitation of the generality, the press-in element 3 shown in FIGS. 2A-2E is produced from a thermoplastic material reinforced with continuous carbon fibers. If a press-in element consisting of CFK is pressed into a workpiece, which is also produced from CFK, favorable effects are created for example, but not exclusively, with regard to thermal expansion behavior and corrosion behavior. Unlike as in the case of press-in elements which are produced from specific metallic materials, corrosion cannot occur specifically between CFK and CFK. However, the press-in element 3 can also be produced from other materials, also from metallic materials, and also from other plastics which are possibly fiber-reinforced.

Referring back to FIG. 1B, it can be seen that an end face of the main body 4 of the press-in element 3 (in FIG. 1B the press-in element 3 of FIG. 2B is shown by way of example) aligns with processing surface 1a on the side of said processing surface 1a of the workpiece 1. On the rear side 1b of the workpiece 1, the press-in element 3 does not quite penetrate to the rear side 1b but is recessed behind the rear side. Since, as is also evident in FIG. 1B, the press-in element 3 has a slight oversize in relation to the hole 2, a surface pressure is created between the inner surface 2a of the hole 2 (see FIG. 1A) and the outer surface of the main body 4 of the press-in element 3 and holds the press-in element 3 fast in the hole 2. This surface pressure effects a force perpendicularly to a laminate plane of the workpiece 1, produced from CFK, on the inner surface 2a (FIG. 1A) of the hole 2 during the pressing in of the press-in element 3. As indicated by a dashed contour in FIG. 1B, the thickness t3 of the press-in element 3 can vary and can possibly even project beyond the rear side 1b or align with this.

During the pressing of the press-in element 3 into the workpiece 1, which is produced from CFK, precision of the positionally accurate pressing of the press-in element 3 into the hole 2 is particularly important since eccentric or angular misalignments of the press-in element 3 in relation to the hole 2, even in the case of the smallest degree of misalignment, can lead to damage on one side or spot damage to the inner surface 2a of the hole 2 (and/or of an outer surface of the main body 4 of the press-in element 3). Consequently, the effectiveness of the pressed connection between the inner surface 2a of the hole 2 and the outer surface of the cylindrical main body 4 of the press-in element 3 can be significantly reduced. For this reason, for carrying out the method steps shown in FIG. 1A and FIG. 1B for introducing a hole 2 and pressing a press-in element 3 into the hole 2 use is made according to the invention of a device which intrinsically combines both functions of drilling and pressing in, wherein the device also has a fixing functionality with the aid of which the workpiece 1 can be fixed in relation to the workpiece before commencement of the drilling.

Such a device, which in the previously indicated manner intrinsically combines the functionalities of fixing the workpiece 1, introducing the hole 2 into the workpiece 1 and positioning and pressing the press-in element 3 into the hole 2, is described below with reference to the representation in FIGS. 3 and 4 as a further exemplary embodiment of the present invention.

Figure 3:
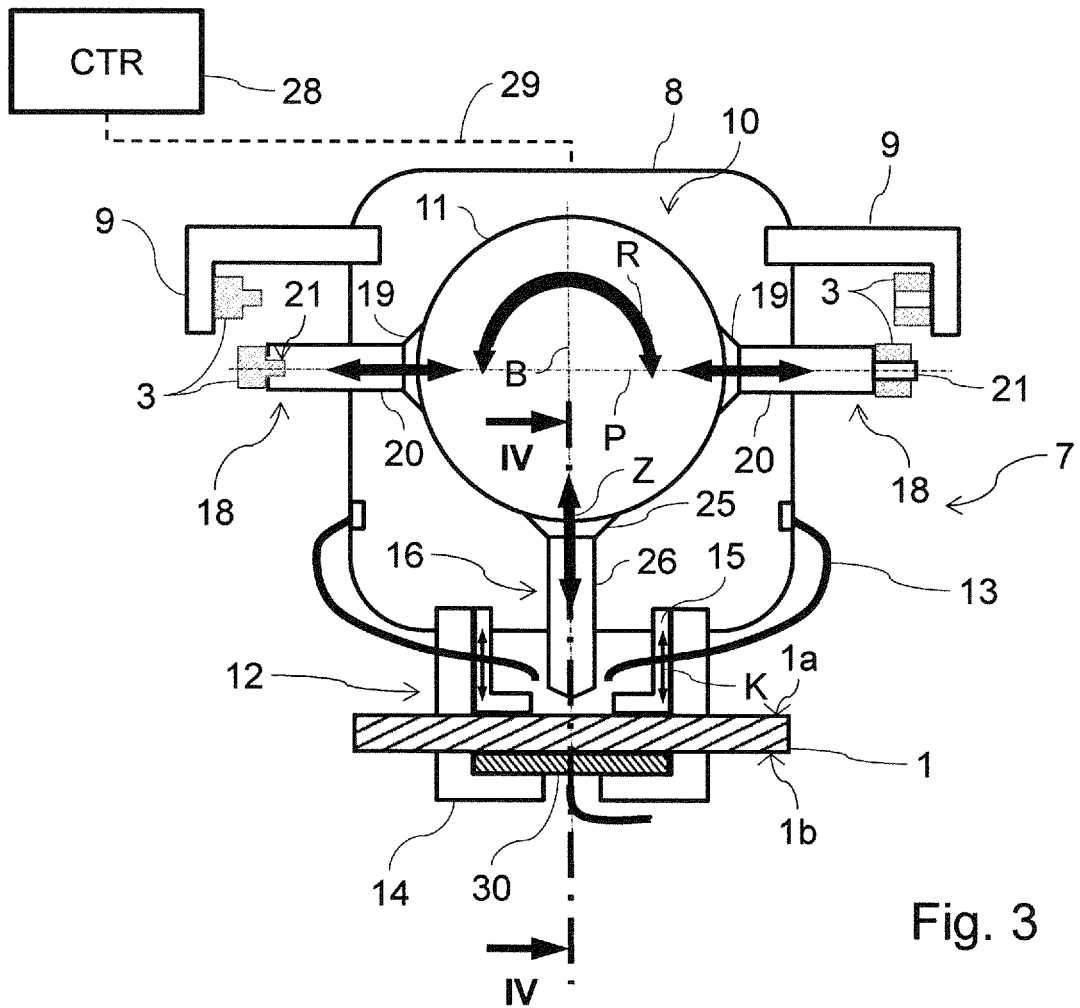
FIG. 3 is a schematic representation of a setting device as a further exemplary embodiment of the present invention.
Figure 4:
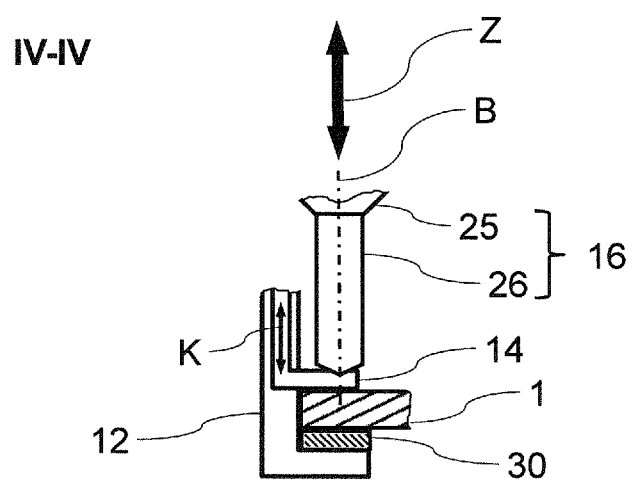
FIG. 4 is a schematic representation of a detail in a sectional view taken along line IV-IV indicated in FIG. 3.

FIG. 3 shows a schematic representation of a setting device 7 for setting a press-in element into a workpiece in a front view, and FIG. 4 shows the setting device 7 of FIG. 3 in a sectioned detail, wherein the line of intersection and the direction of view of the sectional view of FIG. 4 is symbolized by arrows IV-IV in FIG. 3 by means of a dash-dot line.

According to the representation in FIG. 3, the setting device 7 has a basic body 8, two feed units 9, a processing unit 10 with a tool holder 11, a fixing unit 12 and a suction device 13.

The fixing unit 12 has a support element 14 and a clamping element 15. The support element 14 is fixedly attached on the basic body 8. The support element 14 in the depicted exemplary embodiment is designed as a bracket (also referred to as a clamping bracket) which grips behind the workpiece 1 from its rear side 1b. The clamping element 15 in the depicted exemplary embodiment is designed as a bracket (also referred to as a clamping jaw) which is displaceably mounted on the support element 14 and is movable in a clamping direction K by a drive device,—not shown in detail—and when in use clamps, and therefore fixes, the workpiece 1 from its processing side to the support element 14. The support element 14 and the clamping element 15 can have a recess which corresponds at least to the diameter of the hole or of the press-in element 3 or of a press-in tool. Alternatively, provision can also be made in each case for a pair of support elements 14 and a pair of clamping elements 15 which grip on both sides of the hole or of the processing point.

The processing unit 10 has a drilling unit 16 and two press-in units 18 which are mounted on the tool holder 11 of the processing unit 10. The tool holder 11 in the depicted exemplary embodiment is designed as a rotatable head which is rotatably mounted in relation to the basic body 8 in a rotational direction R around a rotational axis which, with the workpiece 1 in a fixed state, extends parallel to the processing surface 1a of the workpiece 1 and by a drive device—not shown in detail—is movable in the rotational direction R. Each of the press-in units 18 has a guide part 19 which is fixedly accommodated (screwed in, secured by bolts, or the like) in the tool holder 11. In the guide part, a pressing part 20 (also to be referred to as a plunger 20) is movable along a pressing axis P and is axially movably mounted by means of a drive unit—not shown in detail. The pressing part 20 of each press-in unit 18 on its outer end has a formed part 21 which is adapted to a formed feature of a specific press-in element 3. In the case of a press-in element 3 with a through-hole according to FIG. 2C, the formed part 21, as shown for example on the right-hand side of FIG. 3, is designed in the form of a pin which is adapted to the through-hole 6 (FIG. 2C) of the press-in element 3. In the case of a press-in element 3 which has a spigot 5 according to FIG. 2B, the formed part 21 of the pressing part 20 of the press-in unit 18 is designed, for example, in the form of a recess which is adapted to the spigot 5 of the press-in element 3, as shown on the left-hand side in FIG. 3. In the depicted exemplary embodiment, the formed part 21 and the pressing part 20 are formed in one piece in each case. In one modification, it is also contemplated to provide exchangeable formed parts 21 which, for example, can be screwed on or attached in another way on identically formed pressing parts 20 in each case.

Each of the feed units 9 is designed to feed press-in elements 3 of one type in each case so that they can be received from a respective press-in unit 18 having a formed part 21 which is adapted to the type of press-in element 3. In other words, the feed unit 9 on the right-hand side of the representation in FIG. 3 is designed for feeding press-in elements 3 of the type shown in FIG. 2C (with a through-hole 6, refer there) and to be available for receiving said press-in elements by the press-in unit 18 on the right-hand side of the representation in FIG. 3, which has a pin as the formed part 21, when the press-in unit 18 is located in a corresponding transfer position. Equally, the feed unit 9 on the left-hand side of the representation in FIG. 3 is designed for feeding press-in elements 3 of the type shown in FIG. 2B (with a spigot 5, refer there) and to be available for receiving said press-in elements by the press-in unit 18 on the left-hand side of the representation in FIG. 3, which has a recess as the formed part 21, when this press-in unit 18 is located in a corresponding transfer position. The receiving of the press-in element 3 by the press-in unit 18 can be brought about in each case by a feed movement of the pressing part (plunger) 20 of the respective press-in unit 18, as a result of which the respective formed feature (through-hole, spigot) of the press-in element 3 enters or joins onto the respective formed part 21 (pin, recess) of the respective pressing part 20. As a result of the means—not shown in detail—such as an O-ring or the like inserted in a groove, it can be ensured that the press-in element 3 is retained on the formed part 21 during the axial return movement of the pressing part 20 of the respective press-in unit 18.

The drilling unit 16 of the setting device 7, according to the representation in FIG. 3, in a similar way to the press-in units 18, has a guide part 25 which is fixedly accommodated (screwed in, screwed on or the like) on the tool holder 11 of the processing unit 10. In the guide part 25, a drilling part 26 is movable along a drilling axis B and is mounted in an axially drivable manner by a drive device—not shown in detail. The drive—not shown in detail—of the drilling part 26 can include a rotation around the drilling axis B, or the drilling part 26 itself has a rotational drive for rotation of a drill around the drilling axis B.

A computing unit (open-loop control device) 28 is also associated with the setting device 7 and is connected via a signal line 29 to the setting device 7 or respective drive units, possibly also to sensor elements—not shown in detail. The computing unit 28 executes a previously stored program which controls the functions and processes, previously indicated with reference to FIGS. 1A and 1B and described more precisely below, of the setting device 7.

In the depicted situation according to FIG. 3 and FIG. 4, the workpiece 1 is clamped between the support element 14 and the clamping element 15 of the fixing unit 12 and as a result is fixed in a stationary manner with regard to the basic body 8 of the setting device 7. To be more precise, the workpiece 1 rests by its rear side 1b on a base 30 which in its turn rests on the support element 14 of the fixing unit 12, whereas the clamping element (the clamping jaws) 15 of the fixing unit 12 acts directly upon the processing surface 1a of the workpiece 1. The clamping effect of the clamping element 15 and of the support element 14 in the clamping direction K can be initiated by of an automated or manual input command on the computing unit 28 and initiates the commencement of the processing program.

In the depicted situation according to FIG. 3 and FIG. 4, the tool holder 11, which according to the previous description is rotatable in a rotational direction R with regard to the basic body 8, is located in a rotated position in such a way that the drilling unit 16 is located in a working position, i.e. the drilling part 26 of the drilling unit 16 points perpendicularly to the processing surface 1a of the workpiece 1, wherein the drilling axis B is perpendicular to the processing surface 1a of the workpiece 1 and the processing surface 1a coincides with a previously established processing point. This rotational position can be immovably fixed (locked) with the aid of means—not shown in detail—such as a locking bolt which is mounted on the basic body 8 and engages in a recess—not shown in detail—of the tool holder 11. The computing unit 28 controls the drive—not shown in detail—in such a way that the drilling part 26 or a drill mounted therein is made to rotate and the drilling part 26 is moved towards the workpiece along the drilling axis B in the feed direction Z, which coincides with the drilling axis B, and controls these movements, possibly taking into account suitable sensor signals with regard to rotational speed, feed speed and/or advancing force, in order to introduce a hole (cf. hole 2 in FIG. 1A) into the workpiece 1 according to the previous description in relation to FIGS. 1A to 2C. After the hole has been produced, the drilling unit or the drilling part 26 is reversed by means of corresponding actuation by the computing unit 28, and a possibly provided lock (locking bolt), which fixes the rotational position of the tool holder 11, is released.

By way of the suction device 13, which is provided on the setting device 7, drilling residues such as drilling dust, drilling particles, fiber pieces, workpiece fragments or the like are sucked up from the processing point during the drilling process.

After that, the tool holder 11, by means of actuation by the computing unit 28, is rotated along the rotational direction R (by 90°, since the drilling and the pressing axes B, P in the depicted exemplary embodiment are perpendicular to each other) so that that press-in unit 18 with the correct press-in element 3 is brought into its working position, according to the processing program, in which the pressing axis P extends perpendicularly onto the processing surface 1a of the workpiece 1 and meets the previously established processing point. (It is understood that the processing point can now no longer be visible since the hole 2 (FIG. 1A) is now located at this point). In other words, in the working position of the press-in unit 18, the pressing axis P is located in exactly the same position in which the drilling axis B was previously located. As a result of the fastening in the tool holder 11, the movements of the drilling unit 16 and of the press-in unit(s) 18 are conducted in a combined manner so that their relative position in relation to each other does not alter. After possible locking of the rotational position of the tool holder 11, the press-in unit 18 is now actuated so that the pressing part (the plunger) 20 with the press-in element 3 accommodated thereon or therein is fed in the feed direction Z (cf. FIG. 1B) and the press-in element 3 is pressed into the hole. Since the press-in element 3 is elastically accommodated on the pressing part 20 by use of the previously mentioned O-ring or the like (and therefore also has a slight clearance), the press-in element 3 can be aligned and centered on the hole. The pressing force of the pressing part 20, however, acts exactly perpendicularly and centrally to the processing surface 1a of the workpiece 1 so that the press-in element 3 is pressed exactly perpendicularly into the hole of the workpiece 1. For further details of the pressing process, including press-in depth, etc., reference may be made to the previous description of the method in conjunction with FIGS. 1A-2E.

After pressing in of the press-in element 3 by a press-in depth which is predetermined by the processing program, the pressing part 20 of the corresponding press-in unit 18 reverses, the possible lock is released and the tool holder 11 is again rotated into the rotational position shown in FIG. 3. After that, the fixing unit 12 is released so that the workpiece 1 can be extracted.

The invention was previously described based on preferred exemplary embodiments, embodiment variants, embodiment alternatives and modifications and illustrated in the figures. These descriptions and representations are purely schematic and do not limit the extent of protection of the claims but serve only for their exemplary illustration. It is understood that the invention can be embodied and modified in a variety of ways without departing from the extent of protection of the patent claims.

For example, two press-in units 18 and one drilling unit 16 are shown in FIG. 3. It is understood that this number is quite optional and can be adapted depending on the number of types of press-in element 3. To this end, there can also be a deviation from the right-angled arrangement of the drilling axis B and of the pressing axis P of each press-in unit 18 and, for example, two drilling units 16 (with drills of different diameter) and four press-in units 18 for four types of press-in elements 3 can be accommodated in the tool holder 11 in each case at an angular distance of 60°.

It is also understood that the use of the base 30 is optional and can be omitted in suitable application cases.

Although in FIG. 3 the tool holder 11 is represented as a rotatable head, there can be deviation from this construction and the tool holder 11 can be constructed as a slide, for example, which is displaceable parallel to the processing surface 1a of workpiece 1. In this case, the drilling unit 16 and the press-in units 18 would also have an invariable positional relationship with each other, wherein here the drilling axis B and the pressing axis P, which can also be referred to as working axes, would extend parallel to each other, and during linear displacement of the slide (tool holder 11) would execute a combined movement. The setting of the respectively identical working position can again be secured by a suitable lock, for example a form-fitting lock.

A still further modification can be designed in such a way that the tool holder 11 accommodates the drilling unit 16 and the press-in units 18 with parallel working axes (drilling axis B, pressing axis P) and in its turn is rotatable around a rotational axis which also extends parallel to the working axes.

According to the previous description, it is provided that for each type of press-in element 3 provision is made for a feed unit 9 which feeds only one type of press-in element in each case to the respective press-in units 18. It is also contemplated, especially in the last two modifications in which the working axes extend parallel to each other and both the drilling unit 16 and the press-in units 18 always point towards the workpiece 1, that provision is made for a single feed unit which feeds press-in elements 3 of a different type directly to the processing point in a sequence which can be predetermined by a processing program. This can be effected, for example, in the manner of a cartridge belt feed, blister feed or the like.

In a still further modification, it is also contemplated that the tool holder 11 has a displacement unit in which a multiplicity of tool modules, which in each case accommodate a single tool such as a drilling unit or a press-in unit, are mounted in a displaceable and drivable manner, wherein the respectively identical working position can again be locked by suitable measures.

In a development of the basic exemplary embodiment shown in FIG. 3, it is also contemplated that the tool holder 11, which is designed as a rotatable head, has two or more planes of individual tools (drilling units, press-in units), accommodated in a star-like arrangement, and the tool holder 11 is linearly displaceable along a rotational axis, predetermining the rotational direction R, by a distance which corresponds exactly to the spacing of the tool planes.

In a further modification of the basic exemplary embodiment of FIG. 3, it can also be provided that the tool holder 11 or the processing unit 10, which accommodates the tool holder 11 in a rotatably mounted manner, is displaceably mounted, and is able to be driven, in relation to the basic body 8 in the feed direction Z. In this case, the drilling unit 16 and the press-in units 18 would be rigidly accommodated or could be rigidly accommodated in each case in the tool holder 11. Both types of movement can be combined, however, by, for example, both the entire processing unit 10 being displaceable in the feed direction Z but a final working stroke being executed by the drilling unit 16 itself or by the press-in units 18 themselves.

In the previously described exemplary embodiment, the fixing unit 12 has a support element 14 and a clamping element 15. This arrangement is particularly advantageous in applications in the proximity of an edge of the workpiece 1. If press-in elements 3 are to be positioned further away from the edge of the workpiece 1, consideration can be given to this by an extension of the reach of the support element 14 and the clamping element 15. After a determined distance from the edge of the workpiece 1, it can be advantageous to resort to other types of fixing of the workpiece which avoid gripping under the workpiece. An embodiment variant can have suction elements, for example, which suck onto the workpiece 1, or (possibly movable) gripping elements which engage in recesses on the workpiece, provided for this, and fix the workpiece in this manner. Although not shown in detail, provision can be made for a monitoring function via quality assurance systems.

LIST OF DESIGNATIONS

1 Workpiece
1a Processing surface (processing side)
1b Rear side (reverse surface)
2 Hole
2a Inner wall (inner surface)
3 Press-in element
4 Main body
5 Spigot
6 Hole
7 Setting device
8 Basic body (flange plate)
9 Feed unit
10 Processing unit
11 Tool holder (rotatable head)
12 Fixing unit
13 Suction device
14 Support element (clamping bracket)
15 Clamping element (clamping jaw)
16 Drilling unit
18 Press-in unit
19 Guide part
20 Pressing part (plunger)
21 Formed part (pin/recess/ring)
25 Guide part
26 Drilling part
28 Computing unit (open-loop control device)
29 Signal line
30 Base
41 Locking hook
42 Ring
43 Incision
44 Hole
45 Chamfer
50 Plate
50a Stop surface
$d_1$ Diameter (of a workpiece or of a hole j)
$t_1$ Depth of thickness (of a workpiece j)
B Working axis (drilling axis)
K Clamping direction
P Working axis (pressing axis)
R Rotational direction
Z Feed direction The above list of the designations and abbreviations is an integral part of the description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting a press-in element into a workpiece formed of plastic or fiber composite material, the method comprising the steps of:
    fixing the workpiece;
    introducing a hole into the workpiece;
    positioning a press-in element over the hole introduced into the workpiece by a press-in unit; and
    pressing the press-in element into the hole by actuating the press-in unit such that a plunger of the press-in unit, with the press-in element accommodated on or in the plunger, is fed in a feed direction toward the hole, wherein
    the method is carried out via a single device that combines the preceding steps wherein the press-in element is held on or in the plunger of the press-in unit by an elastic element until the press-in element is pressed into the hole such that the press-in element is retained on or in the plunger of the press-in unit against action of inertia and shear forces.

2. The method according to claim 1, further comprising the step of:
    pretreating a processing surface at least in a region of the hole in the workpiece.

* * * * *